United States Patent [19]

Petersen

[11] 4,050,172
[45] Sept. 27, 1977

[54] EXCAVATOR TOOTH, HOLDER THEREFOR AND STAPLE RETAINER

[76] Inventor: Gerald A. Petersen, San Francisco, Calif.

[21] Appl. No.: 565,776

[22] Filed: Apr. 7, 1975

Related U.S. Application Data

[63] Continuation of Ser. No. 431,509, Jan. 7, 1974, abandoned, which is a continuation-in-part of Ser. No. 330,050, Feb. 6, 1973, Pat. No. 3,826,024, which is a continuation-in-part of Ser. No. 215,739, Jan. 6, 1972, Pat. No. 3,751,834.

[51] Int. Cl.² .................................................. E02F 9/28
[52] U.S. Cl. .................................. 37/142 A; 85/8.8;
279/79; 403/319; 403/377
[58] Field of Search .............. 85/8.8, 8.3; 24/211 L,
24/211 K; 403/319, 355, 377, 376, 361, 315,
324, 326; 285/305, 321; 279/79, 80; 37/141 R,
141 T, 142 R, 142 A; 172/713; 299/92

[56] References Cited

U.S. PATENT DOCUMENTS

| | | | |
|---|---|---|---|
| 1,443,277 | 1/1923 | Robinson | 24/211 K |
| 1,458,811 | 6/1923 | Eckert | 85/8.8 UX |
| 1,949,027 | 2/1934 | Pancoe | 24/211 K |
| 2,147,163 | 2/1939 | Jimerson | 85/8.3 X |
| 2,162,811 | 6/1939 | Guy | 85/8.3 |
| 2,164,988 | 7/1939 | De Biasi | 37/141 T |
| 2,230,424 | 2/1941 | Bruton | 37/142 R |
| 2,844,378 | 7/1958 | Whistler et al. | 37/142 A UX |
| 3,091,044 | 5/1963 | Penote et al. | 37/142 R |
| 3,144,909 | 8/1964 | Hart et al. | 85/8.8 X |
| 3,349,508 | 10/1967 | Petersen | 37/142 A |
| 3,400,476 | 9/1968 | Petersen | 37/142 A |
| 3,426,459 | 2/1969 | Petersen | 37/142 R |
| 3,584,902 | 6/1971 | Vyse | 285/305 |
| 3,704,753 | 12/1972 | Hasforth et al. | 37/142 R X |
| 3,753,582 | 8/1973 | Graham | 285/305 |
| 3,826,024 | 7/1974 | Petersen | 37/142 A |
| 3,864,853 | 2/1975 | Klett et al. | 37/141 T |

Primary Examiner—Clifford D. Crowder
Attorney, Agent, or Firm—Julian Caplan

[57] ABSTRACT

A retainer of generally U-shape having slightly diverging legs detachably secures the proximal part of an excavating tooth within a complementary recess in its holder. The proximal end of the tooth has a generally rectangular cross-section with opposed outward extending ears and rearwardly thereof is formed with a spindle having a shoulder at the back. In the operative position of the retainer, a portion of the retainer straddles the spindle immediately in front of the shoulder. At least one leg of the retainer is formed with an upper offset leg portion and with oppositely offset lower leg portion with an interconnection there-between. The upper offset portion fits ahead of the shoulder to retain the tooth in place when the retainer is in operative position; but when the retainer is retracted to inoperative position, the upper offset portion of the leg clears the shoulder of the spindle of the tooth. The tooth holder is formed with an opening in which the retainer slides and the opening has an inward protuberance which engages the connecting portion to prevent unintentional complete withdrawal of the retainer so that it is not lost when it has been moved to retracted position. An improved distal tooth shape is disclosed wherein the blade has a body of substantially uniform thickness from front to rear with a central rib whereby the tooth remains sharp during its life. At the rear of the distal portion of the tooth is an abrupt shoulder which inhibits use of the tooth after its cutting life is exhausted and prevents excessive use from damaging the holder.

8 Claims, 14 Drawing Figures

EXCAVATOR TOOTH, HOLDER THEREFOR AND STAPLE RETAINER

This invention relates to an excavator tooth, holder therefor and a staple retainer. This invention is a continuation of copending application Ser. No. 431,509, filed Jan. 7, 1974, now abandoned, which was a continuation-in-part of copending application U.S. Ser. No. 330,050 filed Feb. 6, 1973, now U.S. Pat. No. 3,826,024 which is a continuation-in-part of Ser. No. 215,739, now U.S. Pat. No. 3,751,834, filed Jan. 6, 1972.

More particularly, the invention relates to a staple-shaped retainer, the legs of which initially diverge and which is inserted in an opening in a tooth holder. The tooth holder has a recess which receives the shank of proximal end of the tooth in such manner that at least one leg of the retainer fits into a notch formed in a spindle on the rear of the tooth having a shoulder at the rear of the notch. When forces tend to withdraw the tooth, the shoulder is stopped by the retainer, holding the tooth in place. When the retainer is retracted, the leg does not fit into the notch and the tooth is removable. A protuberance is formed in the opening in the holder to prevent unintentional complete withdrawal of the retainer as it is moved to inoperative position.

One principal feature of the present invention is that at least one leg of the retainer is formed with offset portions so that when the retainer is fully inserted in the holder in operative position, the upper offset leg portion is engaged by a shoulder on the proximal end of the tooth to restrain withdrawal of the tooth from the holder. An interconnection between the upper and lower portions of the leg engages the aforementioned protuberance so that the retainer cannot be unintentionally completely withdrawn.

Another feature of the invention is the fact that the retainer is normally spaced from the spindle of the tooth so that when the tooth moves in its socket it does not repeatedly strike and thereby break the retainer. It is only when there is a force, such as gravity or the equipment being backed off from a sticky substance which tends to pull the tooth out of its holder, that the tooth and retainer contact each other. Prior retainers have been designed with the idea of firmly holding the tooth in the holder, even when no force tends to pull it away, requiring a retainer of great strength. The present invention does not follow this prior concept since forces are transmitted from the tooth directly to the holder rather than to the retainer, and the retainer is not normally stressed.

Another feature of the invention is the fact that teeth may be changed very rapidly without special tools and may usually be removed and installed by hand. A small tool such as a screwdriver may be used to retract the retainer and to pull the tooth from its holder. Locking the tooth in place is likewise simple, since it is only necessary to manually depress the retainer.

Another feature of the invention is the shape of the distal portion of the tooth. Essentially it has a spade-like blade with a longitudinal rib for strength so that in cross-section it resembles an inverted T. The blade is the same thickness for its entire length, whereas most prior teeth become thicker proceeding rearwardly.

Another feature of the invention is the fact that the tooth is constructed so that when its blade is exhausted by wear, the tooth will not dig any longer. The tooth has a shoulder in front of the holder which protects the holder from wear when the tooth is exhausted, whereas in prior constructions when the tooth was worn out continuance of digging wore the forward end of the holder, requiring frequent replacements of holders. In accordance with the present invention, the tooth protects the holder and the fact that it no longer functions to dig indicates to the user the necessity for replacement.

Another feature of the invention is the fact that the tooth is less expensive than competitive teeth of equivalent capacity. Elimination of wear and consequent replacement of the holder further enhances the economic value of the invention.

Another feature of the invention is the fact that the retainer may be installed at such an angle relative to the holder so that as the holder moves in a circular path, as is common in trench digging machines of the chain-type where the chain passes around sprockets at either end of its stretch of travel and in bucket-type trench diggers, centrifugal force does not tend to move the retainer from operative to inoperative position and permit the tooth to fly out of its holder.

Still another feature of the invention is the provision of a tooth shank which is of generally rectangular cross-section with opposed projecting ears, the holder being formed with a recess complementary to such shape. Means is provided to eliminate possibility of installing the tooth inverted. However, other distal tooth shapes permit reversal (inversion) in the holder and means is provided in those instances for tooth inversion.

Other objects of the present invention will become apparent upon reading the following specification and referring to the accompanying drawings in which similar characters of reference represent corresponding parts in each of the several views.

Figure 2:
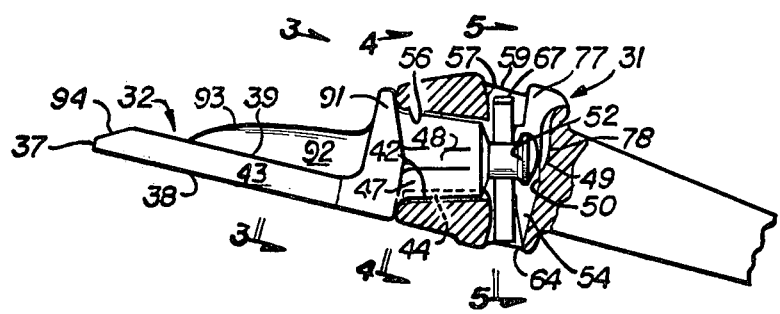
FIG. 2 is a side elevation thereof, partly broken away in section to reveal internal construction.
Figure 4:
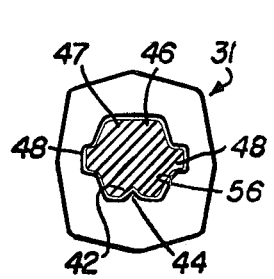
Figure 3:
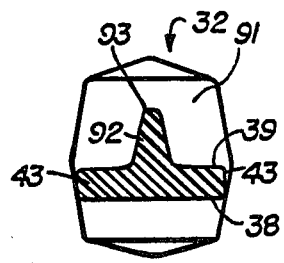
Figure 5:
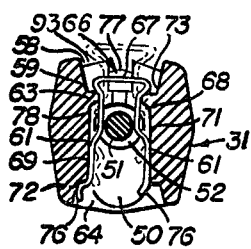

FIGS. 3, 4 and 5 are sectional views taken substantially along the lines 3—3, 4—4 and 5—5, respectively, of FIG. 2.

Figure 4A:
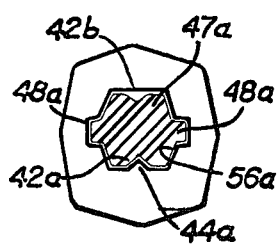

FIG. 4A is a view similar to FIG. 4 of a modification.

Figure 6:
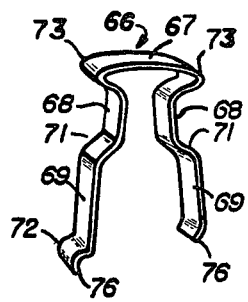

FIG. 6 is a perspective view showing a retainer used to hold the tooth in its holder.

Figure 7:
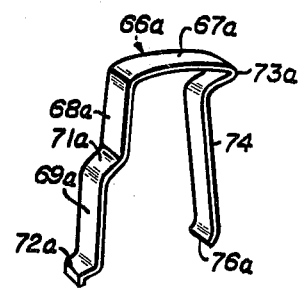

FIG. 7 is a view similar to FIG. 6 of a modified retainer.

Figure 8:
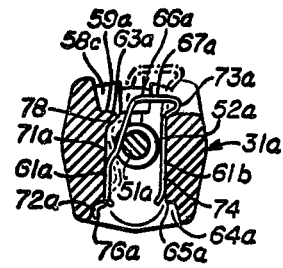

FIG. 8 is a view similar to FIG. 5 showing the retainer of FIG. 7 installed.

Figure 9:
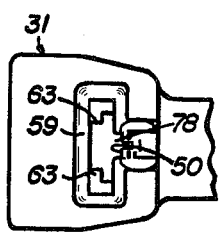

FIG. 9 is a fragmentary top plan of a portion of the holder with both tooth and retainer removed.

Figure 1:
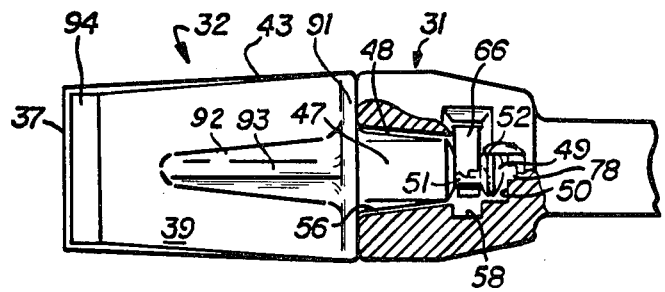
FIG. 1 is a top plan view of a tooth and holder in accordance with the present invention, partly broken away to reveal internal construction.
Figures 10, 12:
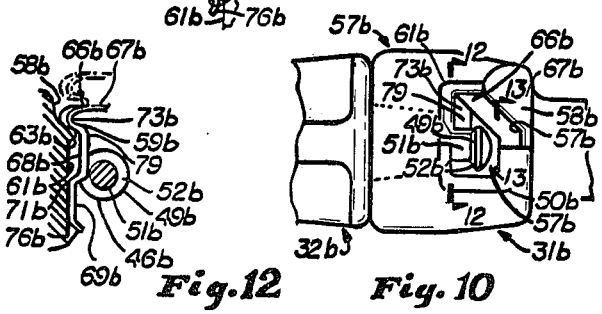

FIG. 10 is a view similar to FIG. 1 of a modification.

Figure 11:
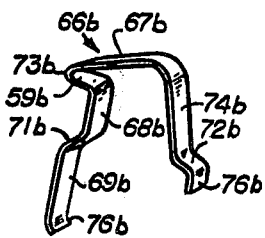

FIG. 11 is a view similar to FIG. 6 of the modification of FIG. 10.

Figure 13:
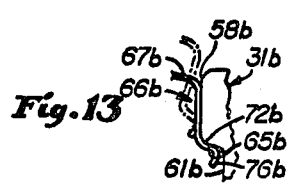

FIGS. 12 and 13 are sectional views taken substantially along lines 12—12 and 13—13, respectively, of FIG. 10.

Directing attention to FIGS. 1–6, holder 31 and tooth 32 are held in place by retainer 66. Tooth 37 has a distal portion formed with a downwardly-rearwardly slanting bottom surface 38 and a parallel top surface 39. The side edges 43 may taper forwardly. The forward end of the blade between the surfaces 38 and 39 is beveled as indicated by reference numeral 94 to provide a transverse cutting edge 37. Commencing approximately two-thirds of the distance rearward from edge 37 is a rib 92 which slants upwardly-rearwardly and preferably has its top edge 93 triangular in cross-section. At the rear of the distal portion is an upward extending shoulder 91 which rises from the top surface 39 to an elevation approximately equal to that of the top of the forward end of holder 31.

The rearwardly slanted parallel surfaces 38, 39 provide a blade of constant thickness which gradually wears during the life of the tooth but always remains sharp. The function of rib 92 is to strengthen the blade against fracture and the top edge 93 assists in digging through certain types of soil. The shoulder 91 not only protects the forward face of holder 31 against abrasion but also functions to indicate termination of the life of the blade when the blade is exhausted. The blunt forward surface of shoulder 91 cannot function to dig into the earth, and hence, when the operator of digging equipment realizes that the shoulder 91 is working against the soil, the necessity for changing teeth is apparent. One of the problems encountered in maintenance of digging equipment is the fact that overwear of the tooth tends to damage the holder by abrasion, requiring replacement of the holder rather than just the tooth. The present invention eliminates the possibility of wearing the holder to the point where it must be discarded.

The proximal end 46 of tooth 32 is formed with a shank 47 which is rectangular and preferably square and has opposed ears 48 extending laterally outwardly on opposite sides of shank 47 and tapering rearwardly. As is best shown in FIG. 4, the thickness of the ears 48 is considerably less than the thickness of shank 47. The ears 48 stabilize the tooth in its holder and facilitate installation and withdrawal of the tooth. To facilitate fabrication and also installation, the shank may taper rearwardly. To insure correct placement of the tooth, groove 42 is formed therein for a purpose which is hereinafter explained.

The back of the proximal portion of tooth 32 is formed preferably round in cross-section and terminates in a blunt end 49, recess 56 in holder 31 being formed with a circular cross-section rearward extension 50 to accommodate the end 49 and the rear wall of extension 50 slants downwardly-forwardly. Forward of end 49 a circular notch produces a circular cross-section reduced diameter spindle 51, there being a shoulder 52 behind spindle 51.

Holder 31 is formed with recess 56 which is complementary to shank 47. Rib 44 fits into groove 42 and prevents tooth 32 from being inserted inverted. (See FIG. 4). Some teeth (not shown) are reversible and (See FIG. 4A) shank 47a thereof is formed with top and bottom grooves 42a, 42b so that rib 44a will fit in either of them, thus allowing reversal. Holder 31 is also formed with an opening 57 extending from top to bottom, transverse to the direction of recess 56 and intersecting recess 56 at the location of spindle 51 when tooth 32 is fully inserted in the holder. The length of opening 57 from front to rear walls is about equal to the front to rear length of spindle 57. Extending transversely across the top of the holder as viewed in FIG. 5 immediately above opening 57 is a slot 58 having a bottom surface 59. The side walls 61 of opening 57 extend vertically downwardly transverse to bottom 59. Protuberances 63 are formed extending inward from side walls 61 preferably immediately below bottom 59. The width of protuberance 63 from front to rear is about one-half the corresponding width of opening 57.

On the side of holders 31 opposite slots 58 is a transversely extending dirt opening 64 which also has a bottom 63. The width of protuberance 63 and the slanting of the front and rear walls of opening 57 (FIG. 2) reduce likelihood of dirt compacting in opening 57 and inhibiting movement of retainer 66.

Retainer 66, as best shown in FIG. 6, is staple-shaped and is preferably formed of a non-corroding spring stock having a width substantially greater than its thickness and slightly less than the distance between the front and rear walls of opening 57. Stainless steel or rustproof steel are suitable for retainer 66. Retainer 66 has a somewhat outwardly bowed top connection 67 with a pair of legs depending therefrom. In the unstressed position of retainer 66 prior to the insertion in holder 31, the legs diverge outwardly at an angle of about 10°; but when inserted in the opening 57, the legs are compressed toward each other and assume a parallel relationship. This causes the legs to bear against the outer walls 61 and thereby restrains unintentional movement of the retainer 66 within the opening 57 but permits intentional movement of the retainer between operative and inoperative positions. As shown in FIG. 6 there is an upper (inwardly) offset leg portion 68 extending approximately half of the length of the leg and a lower (outwardly) offset leg portion 69 with an interconnection 71 there-between. The term "upper" and "lower" are used relative to the position of FIG. 6, but the position is variable so that centrifugal force does not cause retraction of the retainer. The terms "inwardly" and "outwardly" are also variable as matters of design. The lower extremity 72 of lower leg portions 69 is bent outwardly. As shown in FIG. 5, when the retainer is in its operative position, extremity 72 extends below the opening 57 and into dirt outlet 64 and rests against bottom 65. In order to retract the retainer 66 to its inoperative position, the extremity 72 must be pushed to the right as viewed in FIG. 5 to clear bottom 65. The bottom ends 76 of both legs are bent slightly inward at an angle of about 45°. This facilitates sliding of the retainer between operative and inoperative positions in the event that there is any roughness of the walls 61. It is also apparent that one of the legs of retainer 66 is longer than the other. In installing the retainer in position, the longer leg is first inserted a short distance and then the shorter leg is forced toward the longer leg until it fits into the opening 57.

In the modified form of the invention shown in FIG. 7, only one of the legs is offset. The right-hand leg 74 is substantially straight. A 180° outwardly offset return 73 is formed at the juncture of top connection 67 and the upper end of leg 74. Curved return 73 provides resiliency to the retainer 66 and also functions, as shown in FIG. 4, to limit downward movement of the retainer. As shown in FIG. 8 one wall 61b of opening 57a is straight and the straight leg 74 of retainer 66a engages this wall. There is no protuberance comparable to 63a on wall 61b. In other respects the structure of FIG. 8 is similar to that of FIG. 5 and the same reference numerals followed by subscript a are used to designate corresponding parts.

Preferably the depth of slot 58 is such that in operative position the top 67 is totally concealed, thereby preventing abrasion during digging from wearing the retainer. An upwardly-rearwardly slanted groove 77 is formed in the rear wall of slot 58 to provide access for a prying instrument such as a screwdriver to fit under top connecting portion 67 to raise the retainer 66 from solid-line operative position to dotted-line inoperative position. Preferably groove 77 is curved to function as a fulcrum for a prying instrument. Slot 78 in the back of groove 77 permits a prying instrument to force tooth 32 out of holder 31.

In use, retainer 66 is installed, as heretofore explained, by first inserting the longer (left-hand) leg, then pushing the right-hand leg toward the left-hand leg until the lower end thereof clears the side wall 61. The retainer 66 is then depressed until the interconnections 71 snap below protuberances 63. Thereafter, the retainer 66 cannot be unintentionally removed from holder 31. To install tooth 32, retainer 66 is elevated to dot-and-dash position, as shown in FIG. 5, until interconnections 71 rest immediately below protuberances 63. In this position, the tooth 32 may be installed and pushed back until back end 49 enters recess extension 50. In this position, as best shown in FIG. 5, the legs 74 are remote from spindle 51. Hence the tooth 32 may be inserted or withdrawn. To secure the retainer 66 in its operative position, the top portion 67 is depressed until the lower extremity 72 extends outside of opening 57 and rests against bottom 65 (solid line position of FIG. 5). If the tooth 32 tends to move forwardly relative to holder 31, the shoulder 52 engages the upper inwardly offset leg portion 68, which restrains outward movement of the tooth. The width of retainer 66 is slightly less than the length of spindle 51 and the legs 68 straddle the spindle 57 so that normally the retainer 66 is not under stress. When it is necessary to remove the tooth, the extremity 72 is pushed inward and the connecting portion 67 pulled upward to dot-and-dash position until the interconnection 71 rests against the underside of protuberance 63. A screwdriver may be inserted in slot 77 for this purpose and the back of slot 77 is curved to improve fulcrum section. A screwdriver may also be inserted in slot 78 to pry the back end 49 forwardly in case the tooth tends to stick in the holder.

Directing attention to the form of the invention of FIGS. 10 to 13, retainer 66b is formed with top connecting portion 67b extending skewed at an angle of about 45° rearward relative to the longer leg 79. In this modification, the lower extremity 72b which engages bottom 65b is on the shorter or straight leg 74b. The return 73b connects portion 67b with longer leg 79. The shorter leg 74b is thus behind back end 49b of proximal end 46b of the tooth. Accordingly, the coring of the opening 57b is smaller and the overall width and hence expense of casting the holder 31b is reduced.

Leg 79 provides retention of the tooth and leg 74b locates and secures the retainer 66b. When retainer 66b is inserted in opening 57b, lower extremity 72b of leg 74b snaps into place under bottom shoulder 65b and thereafter the retainer cannot be moved to retracted position until leg 74b is deliberately pushed to the left as viewed in FIG. 13. Protuberance 63b stops complete withdrawal of the retainer by engagement with interconnection 71b of leg 79.

It is noted that legs 79 and 74b are parallel to each other and thus provide the most effective grip on the side walls 61b of opening 57b. Leg 79 upper portion 68b is parallel to the tooth axis to prevent distortion of retainer 66b by forces imposed thereon by the tooth 32b. The manner of retaining the tooth in the holder and the movement of retainer 66b between operative and retracted positions is similar to the version of FIGS. 7 and 8. In many respects, the structure of FIGS. 10 and 13 resembles that of the preceding modifications and the same reference numerals followed by subscript b are used to designate corresponding parts.

It will be understood that the distal and the proximal tooth shapes used with the retainers herein disclosed may differ from those shown in FIGS. 1-4.

What is claimed is:

1. In combination an excavating tooth having a proximal portion of non-circular cross-section and a distal portion, a tooth holder formed with at least one recess complementary to said proximal portion and opening inward from the forward end of said holder and extending inward from said forward end in a first direction, said recess having first side walls extending approximately parallel to said first direction, and a retainer, said retainer having a pair of legs and a connecting portion connecting one end of each said leg, said retainer being formed of a resilient material to resist movement of said legs toward and away from each other, said retainer being slideable in said holder between operative and retracted positions, said holder formed with an opening extending from a first side of said holder to the second side of said holder opposite said first side, said opening having opposed second side walls extending approximately parallel to said first direction, said opening being spaced back from said forward end, said opening extending parallel to a plane generally perpendicular to said first direction, at least one said second side wall having a first portion, a second portion laterally offset with respect to said first portion and a first shoulder interconnecting said first and second portions, said proximal portion of said tooth formed with a notch and having a second shoulder rearward of said notch, at least on leg of said retainer extending along one said second wall adjacent said first and said second sides and into said notch when said retainer is in operative position and abutting said second shoulder to restrain said tooth against dislodgment from said holder, said one leg being movable out of said notch without total removal of said one leg from said holder when said retainer is in retracted position, said legs biased to diverge from each other so that said legs engage said second walls to resist unintentional movement of said retainer, said one retainer leg being entirely inside said holder when said retainer is inoperative position, said retainer being assembled with said holder when either in retracted or in operative position, at least one leg of said retainer having an upper portion, a lower portion offset laterally relative to said upper portion and a third shoulder at the level of the interconnection of said upper and lower portions, said third shoulder being at all times within said opening when said retainer is either in operative or in retracted positions, said first shoulder engaging said third shoulder to limit outward movement of said retainer when said retainer is in retracted position, said distal portion of said tooth comprising a blade having substantially parallel top and bottom surfaces, and a transverse cutting edge at its distal end, said distal end located approximately at the level of said proximal portion, said top and bottom surfaces slanting downwardly-rearwardly, said top surface having a fourth shoulder extending across the width of said distal portion transverse to said proximal portion and extending to an elevation substantially higher than the elevation of said proximal portion to form a protection for the forward end of a holder in which said tooth is held.

2. The combination of claim 1 in which said proximal portion of said tooth is formed as a spindle adjacent its rearward end, said spindle formed with a reduced diameter portion aligned with said opening and comprising said notch and said second shoulder located immediately rearward of said reduced diameter portion.

3. The combination of claim 1 which further comprises a reinforcing rib in the center of said top surface of said tooth extending from a position spaced down from the top of said fourth shoulder downwardly-forwardly to a point on said top surface spaced rearward from said distal end.

4. The combination of claim 3 in which the upper edge of said rib is beveled in cross-section.

5. The combination of claim 1 in which the width of said fourth shoulder and the height of said fourth shoulder are as great as the width and height of the forward end of said holder and the width of said blade is as great as the width of said fourth shoulder.

6. In combination, an excavating tooth having a proximal portion of non-circular cross-section and a distal portion formed with a cutting edge, a tooth holder formed with at least one recess complementary to said proximal portion and opening inward from said forward end in a first direction, said recess having first side walls extending approximately parallel to said first direction, and a retainer, said retainer having a pair of legs and a connecting portion connecting one end of each said leg, said retainer being formed of a resilient material to resist movement of said legs toward and away from each other, said retainer being slideable in said holder between operative and retracted positions, said holder formed with an opening spaced back from said forward end extending from a first side of said holder to the second side of said holder opposite said first side, said opening having opposed second side walls, at least one said second side wall having an inward extending protuberance adjacent said first side, said proximal portion of said tooth formed with a notch and having a second shoulder rearward of said notch, a first leg of said retainer extending along said second wall adjacent said first and said second sides and into said notch when said retainer is in operative position and abutting said second shoulder to restrain said tooth against dislodgement from said holder, said first leg being movable out of said notch without total removal of said one leg from said holder when said retainer is in retracted position, a second leg of said retainer disposed rearward and laterally offset relative to said first leg, a connecting portion connecting said legs at their upper ends and bent rearwardly relative to said first leg, said legs biased to diverge from each other so that said legs engage said second walls to resist unintentional movement of said retainer, said first leg being within said holder when in operative position, said retainer held by said holder both in operative and retracted positions, said first leg having an upper portion, a lower portion offset laterally relative to said upper portion and an interconnection joining said upper and lower portions located approximately midway of the length of said first leg, said interconnection engaging said protuberance to limit outward movement of said retainer when said retainer is in retracted position.

7. The combination of claim 6 in which said retainer is formed of non-circular cross-section metal and one broad flat side of said first leg engages said second wall.

8. A retainer formed of resilient material having a connecting portion, and a pair of legs depending from said connecting portion, said legs diverging, at least one of said legs having an upper portion, a transversely extending portion and a lower portion generally parallel to said upper portion and offset relatively thereto in a direction transverse to said upper portion, said retainer being non-circular in cross-section, said connecting portion when viewed in top plan being disposed at an acute angle relative to a plane perpendicular to said one leg and said legs extending parallel to said plane.

* * * * *